United States Patent [19]
Etzbach et al.

[11] Patent Number: 5,654,122
[45] Date of Patent: Aug. 5, 1997

[54] N-AMINOPYRIDONE DYES

[75] Inventors: Karl-Heinz Etzbach, Frankenthal; Ernst Schefczik, Ludwigshafen; Ruediger Sens, Mannheim; Matthias Wiesenfeldt, Mutterstadt, all of Germany

[73] Assignee: BASF Aktiengesellschaft, Ludwigshafen, Germany

[21] Appl. No.: 470,480

[22] Filed: Jun. 6, 1995

Related U.S. Application Data

[63] Continuation of Ser. No. 140,021, filed as PCT/EP92/00505 Mar. 6, 1992, Pat. No. 5,580,980.

[30] Foreign Application Priority Data

Feb. 22, 1991 [DE] Germany ............... 41 34 805.2
May 3, 1991 [DE] Germany ............... 41 14 456.2

[51] Int. Cl.$^6$ .......... C07D 213/89; C07D 215/38; C07D 265/36; C07D 277/38
[52] U.S. Cl. .......... 430/202; 430/203; 430/235; 430/351; 544/105; 544/131; 544/148; 544/149; 546/171; 546/174; 546/193; 546/194; 546/270.7; 546/277.4; 546/281.4; 546/276.4; 546/277.1; 546/256; 546/278.7; 546/261
[58] Field of Search .................. 430/202, 203, 430/235, 351

[56] References Cited

U.S. PATENT DOCUMENTS

| | | |
|---|---|---|
| 3,725,383 | 4/1973 | Austin et al. ............ 260/146 T |
| 4,102,880 | 7/1978 | Seitz ........................ 260/156 |
| 4,734,349 | 3/1988 | Chapman et al. ............ 430/106 |

*Primary Examiner*—Matthew V. Grumbling
*Attorney, Agent, or Firm*—Oblon, Spivak, McClelland, Maier & Neustadt, P.C.

[57] ABSTRACT

Pyridone dyes useful for thermal transfer have the formula

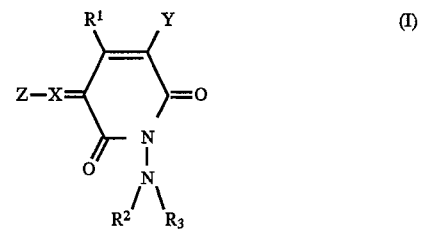

where $R^1$ is hydrogen or $C_1$–$C_4$- alkyl, $R^2$ and $R^3$ are identical or different and each is, independently of the other, hydrogen, substituted or unsubstituted $C_1$–$C_{12}$-alkyl, $C_5$–$C_7$-cycloalkyl, substituted or unsubstituted phenyl, substituted or unsubstituted pyridyl, substituted or unsubstituted $C_1$–$C_{12}$-alkanoyl, $C_1$–$C_{12}$-alkoxycarbonyl, substituted or unsubstituted $C_1$–$C_{12}$-alkylsulfonyl, $C_5$–$C_7$-cycloalkylsulfonyl, substituted or unsubstituted phenylsulfonyl, substituted or unsubstituted pyridylsulfonyl, substituted or unsubstituted benzoyl, pyridylcarbonyl or thienylcarbonyl or are together with the nitrogen atom to which they are bonded unsubstituted or $C_1$–$C_4$- alkyl-substituted succinimido, unsubstituted or $C_1$–$C_4$-alkyl-substituted phthalimido or a five- or six-membered saturated heterocyclic radical which may contain further hetero atoms, X is CH or nitrogen, Y is cyano or a radical of the formula CO—W, CO—OW or CO—NHW where W is hydrogen, $C_1$–$C_8$-alkyl which may be substituted and which may be interrupted by one or two oxygen atoms in ether function, $C_5$–$C_7$-cycloalkyl, phenyl or tolyl, and Z is an aromatic carbocyclic or heterocyclic radical.

9 Claims, No Drawings

N-AMINOPYRIDONE DYES

This is a Continuation, of application Ser. No. 08/140,021 filed on Nov. 1, 1993, now U.S. Pat. No. 5,580,980 which was filed as International Application No. PCT/EP92/00505, on Mar. 6, 1992.

The present invention relates to novel pyridone dyes of the formula I

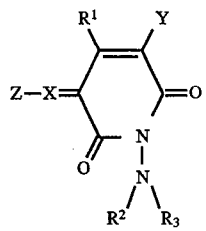

where $R^1$ is hydrogen or $C_1$–$C_4$-alkyl, and $R^3$ are identical or different and each is, independently of the other, hydrogen, substituted or unsubstituted $C_1$–$C_{12}$-alkyl, $C_5$–$C_7$-cycloalkyl, substituted or unsubstituted phenyl, substituted or unsubstituted pyridyl, substituted or unsubstituted $C_1$–$C_{12}$-alkanoyl, $C_1$–$C_{12}$-alkoxycarbonyl, substituted or unsubstituted $C_1$–$C_{12}$-alkylsulfonyl, $C_5$–$C_7$-cycloalkylsulfonyl, substituted or unsubstituted phenylsulfonyl, substituted or unsubstituted pyridylsulfonyl, substituted or unsubstituted benzoyl, pyridylcarbonyl or thienylcarbonyl or are together with the nitrogen atom to which they are bonded unsubstituted or $C_1$–$C_4$-alkyl-substituted succinimido, unsubstituted or $C_1$–$C_4$-alkyl-substituted phthalimido or a five- or six-membered saturated heterocyclic radical which may contain further hetero atoms, X is CH or nitrogen, Y is cyano or a radical of the formula CO—W, CO—OW or CO—NHW where W is hydrogen, $C_1$–$C_8$-alkyl which may be substituted and which may be interrupted by one or two oxygen atoms in ether function, $C_5$–$C_7$-cycloalkyl, phenyl or tolyl, and Z is an aromatic carbocyclic or heterocyclic radical, and to a process for the thermal transfer thereof.

EP-A-416,434 discloses pyridone dyes. However, it has been found that the prior art dyes still have deficiencies in their application properties.

It is an object of the present invention to provide novel N-aminopyridone dyes which are advantageous for thermal transfer.

We have found that this object is achieved by the pyridone dyes of the formula I defined at the beginning.

Aromatic carbocyclic or heterocyclic radicals Z are derived for example from the aniline, aminonaphthalene, indole, quinoline, benzoxazine or aminothiazole series.

Preference is given to pyridone dyes of the formula I where

Z is a radical of the formula

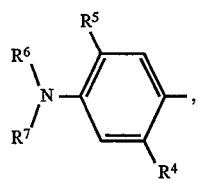 (IIa)

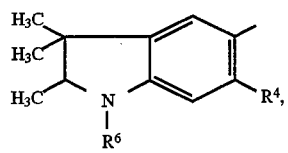 (IIb)

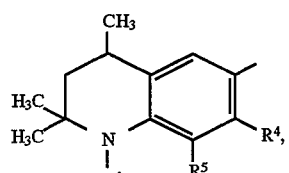 (IIc)

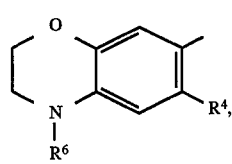 (IId)

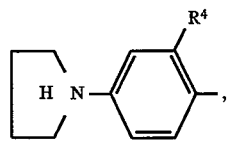 (IIe)

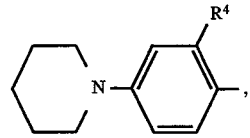 (IIf)

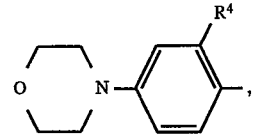 (IIg)

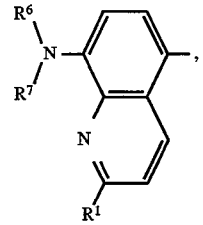 (IIh)

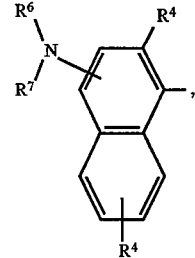 (IIi)

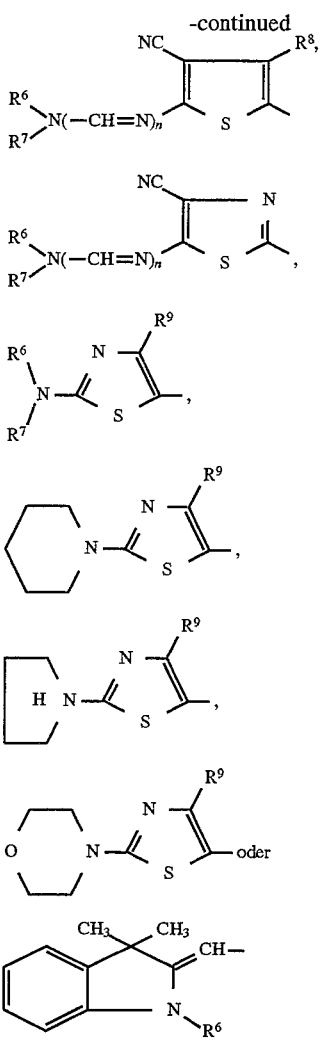

where n is 0 or 1,

R⁴ is hydrogen, methyl, methoxy, $C_1-C_4$-alkylsulfonylamino, mono- or di-$C_1-C_4$-alkylaminosulfonylamino or the radical —NHCOR¹⁰ or —NHCO₂R¹⁰, where R¹⁰ is phenyl, benzyl, tolyl or $C_1-C_8$-alkyl, which may be interrupted by one or two oxygen atoms in ether function, R⁵ is hydrogen, methyl, methoxy or ethoxy, R⁶ and R⁷ are identical or different and each is independently of the other hydrogen, $C_1-C_8$-alkyl, which may be substituted and which may be interrupted by one or two oxygen atoms in ether function, $C_3-C_4$-alkenyl, $C_5-C_7$-cycloalkyl, phenyl or tolyl or are together with the nitrogen atom to which they are bonded a five- or six-membered saturated heterocyclic radical which may contain further hetero atoms, R⁸ is halogen and R⁹ is hydrogen, halogen, $C_1-C_6$-alkyl, substituted or unsubstituted phenyl, substituted or unsubstituted benzyl, cyclohexyl, thienyl, hydroxyl or mono-$C_1-C_8$-alkylamino, and R¹ is as defined in claim 1.

Any alkyl appearing in the formula of the pyridone dyes according to the present invention may be either straight-chain or branched.

Any substituted alkyl appearing in the formula of the pyridone dyes according to the present invention may have as substituents for example cyano, phenyl, tolyl, $C_1-C_6$-alkanoyloxy, $C_1-C_4$-alkoxycarbonyl or $C_1-C_4$-alkoxycarbonyloxy, the last-mentioned of which may in turn be substituted in the alkoxy group by phenyl or $C_1-C_4$-alkoxy.

Any substituted phenyl appearing in the formula of the pyridone dyes according to the present invention may have as substituents for example $C_1-C_4$-alkyl or $C_1-C_4$- alkoxy.

W, R¹, R², R³, R⁶, R⁷, R⁹ and R¹⁰ are each for example methyl, ethyl, propyl, isopropyl, butyl, isobutyl or sec-butyl.

W, R⁶, R⁷, R⁹ and R¹⁰ may each also be for example pentyl, isopentyl, neopentyl, tert-pentyl, hexyl or 2-methylpentyl.

W, R⁶, R⁷ and R¹⁰ may each also be for example heptyl, octyl, isooctyl or 2-ethylhexyl.

R² and R³ may also be for example nonyl, isononyl, decyl, isodecyl, undecyl or dodecyl (the above designations isooctyl, isononyl and isodecyl are trivial names derived from alcohols obtained by the oxo process—cf. Ullmanns Encyklopädie der technischen Chemie, 4th Edition, Volume 7, pages 215 to 217, and also Volume 11, pages 435 and 436), phenyl, 2-, 3- or 4-methylphenyl, 2-, 3- or 4-methoxyphenyl, pyridyl, 2-, 3- or 4-methylpyridyl, 2-, 3- or 4-methoxypyridyl, formyl, acetyl, propionyl, butyryl, isobutyryl, pentanoyl, hexanoyl, heptanoyl, octanoyl, 2-ethylhexanoyl, methoxycarbonyl, ethoxycarbonyl, propoxycarbonyl, isopropoxycarbonyl, butoxycarbonyl, methylsulfonyl, ethylsulfonyl, propylsulfonyl, isopropylsulfonyl, butylsulfonyl, cyclopentylsulfonyl, cyclohexylsulfonyl, cycloheptylsulfonyl, phenylsulfonyl, tolylsulfonyl, pyridylsulfonyl, benzoyl, 2-, 3- or 4-methylbenzoyl, 2-, 3- or 4-methoxybenzoyl, thien-2-ylcarbonyl or thien-3-ylcarbonyl.

W, R⁶, R⁷ and R¹⁰ may each also be for example 2-methoxyethyl, 2- or 3-methoxypropyl, 2-ethoxyethyl, 2- or 3-ethoxypropyl, 2-propoxyethyl, 2- or 3-propoxypropyl, 2-butoxyethyl, 2- or 3-butoxypropyl, 3,6-dioxaheptyl or 3,6-dioxaoctyl.

W, R², R³, R⁶ and R⁷ may each also be for example 2-cyanoethyl, 2- or 3-cyanopropyl, 2-acetyloxyethyl, 2-or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2-or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl, 2- or 3-(2-ethoxyethoxycarbonyloxy)propyl, benzyl, 2-methylbenzyl, 1- or 2-phenylethyl, cyclopentyl, cyclohexyl, cycloheptyl or 2-, 3- or 4-methylphenyl.

R⁴ is for example methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino or (N-methyl-N-ethylaminosulfonyl)amino.

R⁹ may also be for example, like R⁸, fluorine, chlorine or bromine.

R⁹ may also be for example phenyl, 2-methylphenyl, 2,4-dimethylphenyl, 2-methoxyphenyl, 2,4-dimethoxyphenyl, benzyl, 2-methylbenzyl, 2,4- dimethylbenzyl, 2-methoxybenzyl, 2,4-dimethoxybenzyl, methylamino, ethylamino, propylamino, isopropylamino, butylamino, pentylamino, hexylamino, heptylamino, octylamino or 2-ethylhexylamino.

$R^6$ and $R^7$ may each also be for example allyl or methallyl.

$R^2$ combined with $R^3$ or $R^6$ with $R^7$ and with the nitrogen atom to which they are bonded in a five- or six-membered saturated heterocyclic radical which may have further hetero atoms may be for example pyrrolidinyl, piperidinyl, morpholinyl, piperazinyl or N—($C_1$-$C_4$-alkyl)-piperazinyl.

Particular preference is given to dyes of the formula I where Z is a radical of the formula IIa, IIc, III, IIm, IIn, IIo or IIp, in particular a radical of the formula IIc or III.

Of particular noteworthiness are dyes of the formula IIIa

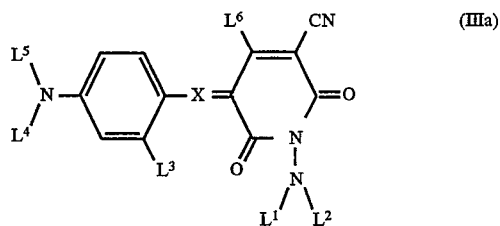

where

X is CH or nitrogen, $L^1$ and $L^2$ are each independently of the other hydrogen, $C_1$-$C_8$-alkyl, phenyl, tolyl, $C_1$-$C_8$-alkylcarbonyl, $C_1$-$C_8$-alkylsulfonyl, phenylsulfonyl, tolylsulfonyl, pyridylsulfonyl, benzoyl, methylbenzoyl, pyridylcarbonyl or thienylcarbonyl, $L^3$ is hydrogen, methyl, methoxy or the radical —$NHCOR^{10}$ or —$NHCO_2R^{10}$, where $R^{10}$ is phenyl, benzyl, tolyl or $C_1$-$C_8$-alkyl, which may be interrupted by one or two oxygen atoms in ether function, $L^4$ and $L^5$ are each independently of the other hydrogen, $C_1$-$C_8$-alkyl, 2-cyanoethyl, benzyl, $C_1$-$C_4$-alkanoyloxy-$C_1$-$C_4$-alkyl, $C_1$-$C_4$-alkoxycarbonyl-$C_1$-$C_4$-alkyl or $C_1$-$C_4$-alkoxycarbonyloxy-$C_1$-$C_4$-alkyl and $L^6$ is hydrogen or methyl.

Also of particular noteworthiness are dyes of the formula IIIb

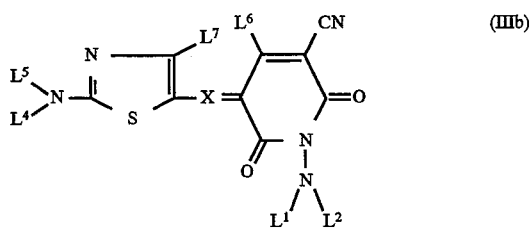

where X is CH or nitrogen, $L^7$ is $C_1$-$C_6$-alkyl, phenyl, tolyl, benzyl, cyclohexyl or thienyl, and $L^1$, $L^2$, $L^4$, $L^5$ and $L^6$ are each as defined under formula IIIa.

Of very particular noteworthiness are dyes of the formula IIIa where $L^1$ and $L^2$ are each independently of one another $C_1$-$C_8$-alkylcarbonyl, benzoyl, methylbenzoyl or thienylcarbonyl.

Also of very particular noteworthiness are dyes of the formula IIIb where X is CH.

The novel pyridone dyes of the formula I can be prepared in a conventional manner.

For example, formyl (X=CH) or nitroso compounds (X=N) of the formula IV $$Z—X=O \quad \text{(IV)}$$

where Z is as defined above, can be condensed with a pyridone of the formula V

where $R^1$, $R^2$ and Y are each as defined above, in an inert solvent in the presence of a catalyst.

Suitable inert solvents are for example toluene, chlorobenzene, nitrobenzene, methyl benzoate, ethyl benzoate, methylene chloride, chloroform, carbon tetrachloride, 1,1-dichloroethane, 1,2-dichloroethane, 1,1,1-trichloroethane, isobutanol, acetic acid, propionic acid, xylene, benzene and dichlorobenzene.

Suitable catalysts are for example p-toluenesulfonic acid, sulfuric acid, acetic anhydride, propionic anhydride, benzoic anhydride and N,N'-dicyclohexylcarbodiimide. These catalysts can be used in an amount of from 1 to 50, preferably from 1 to 10, mole equivalent, based on a mole equivalent of pyridone V.

The resulting dyes of formula Ia

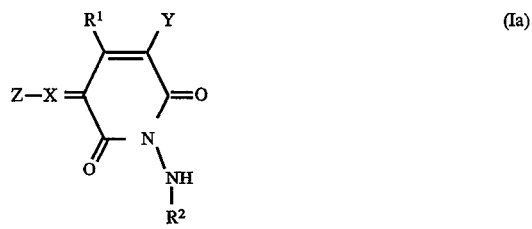

where $R^1$, $R^2$, X, Y and Z are each as defined above, can be for example converted into the pyridone dyes of the formula I by acylation with a carboxylic anhydride of the formula VI or a compound of the formula VII $$R^{11}—CO—O—CO—R^{11} \quad \text{(VI)}$$

$$R^{11}—CO—R^{12} \quad \text{(VII)}$$

where $R^{11}$ is $C_1$-$C_{11}$-alkyl, substituted or unsubstituted with phenyl or thienyl, and $R^{12}$ is a leaving group, for example chlorine, bromine, methylsulfonate, trifluoromethylsulfonate or o- or p-toluenesulfonate, in an inert solvent in the presence or absence of a base.

Suitable bases are for example amines, such as triethylamine, tributylamine, pyridine, p-dimethylaminopyridine, alkali metal bicarbonates such as sodium or potassium bicarbonate, alkali metal carbonates, such as sodium or potassium carbonate, or alkali metal salts of lower carboxylic acids, such as sodium or potassium acetate or sodium or potassium propionate. The amount of base used per mole equivalent of dye Ia is in general from 1 to 50, preferably from 1 to 10, mole equivalent.

However, it is also possible to prepare the dyes of the formula I in a one-pot synthesis by reacting the compounds IV with the pyridone V in the presence of a compound of the formula VI or VII and in the presence or absence of a base. Suitable inert solvents and bases are the abovementioned compounds.

It is also possible to couple amines of the formula VI $$Z—N_2 \quad \text{(VI)}$$

where Z is as defined above, oxidatively with pyridones of the formula V (see for example U.S. Pat. No. 4,695,287).

It is a further object of the present invention to provide a novel process for the thermal transfer of dyes.

In the thermal transfer printing process, a transfer sheet, which contains a thermally transferable dye in one or more binders with or without suitable assistants, on a substrate, is heated from the back with an energy source, for example a thermal head or a laser, in the form of short heating pulses (duration: fractions of a second), causing the dye to migrate out of the transfer sheet and diffuse into the surface coating of a receiving medium. The essential advantage of this process is that the amount of dye to be transferred, and hence the color gradation, is readily controlled by controlling the energy to be emitted by the energy source.

In general, color recording involves the use of the three subtractive primaries yellow, magenta and cyan (with or without black).

To permit optimal color recording, the dyes must have the following properties:

ready thermal transferability, minimal tendency to migrate within or out of the surface coating of the receiving medium at room temperature, high thermal and photochemical stability and resistance to moisture and chemicals, suitable hues for subtractive color mixing, a high molar absorption coefficient, and no tendency to crystallize out on storage of the transfer sheet.

It is known from experience that it is very difficult to meet all these requirements at one and the same time.

For this reason most of the dyes used for thermal transfer printing do not meet the required property profile.

We have found that the further object is achieved by a process for transferring a pyridone dye from a transfer to plastic-coated paper with the aid of an energy source by using a transfer on which there is or are located one or more dyes of the formula I.

Compared with the dyes used in existing processes, the dyes of the formula I transferred in the process of the present invention are in general notable for improved migration properties in the receiving medium at room temperature, a readier thermal transferability, higher thermal and photochemical stability, readier industrial accessibility, better resistance to moisture and chemicals, higher color strength, better solubility or better suitability for subtractive color mixing (higher cleanness of hue, better shape of absorption band).

To prepare the dye transfers required for the process of the present invention, the dyes are incorporated in a suitable organic solvent or in mixtures of solvents with one or more binders, in the presence or absence of assistants, to form a printing ink. It preferably contains the dye in a molecularly dispersed, ie. dissolved, form. The printing ink can then be doctored onto the inert substrate of the later transfer and air dried.

Suitable organic solvents for the dyes I are for example those in which the solubility of the dyes I at 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene and mixtures thereof.

As binders it is possible to use any resin or polymer material which is soluble in organic solvents and capable of binding the dye to the inert substrate in such a way that it will not rub off. Preference is here given to those binders which, after the air drying of the printing ink, hold the dye in the form of a clear, transparent film in which no visible crystallization of the dye occurs.

Such binders are mentioned for example in EP-A-441,282 or in the relevant patent applications cited therein. Saturated linear polyesters are also suitable.

Preferred binders are ethylcellulose, ethylhydroxyethylcellulose, polyvinyl butyrate, polyvinyl acetate, cellulose propionate and saturated linear polyesters.

The weight ratio of binder to dye ranges in general from 1:1 to 10:1.

Suitable assistants are for example release agents as mentioned in EP-A-441,282 or in the relevant patent applications cited therein. It is also possible to use organic additives which prevent crystallization of the transfer dye in the course of storage or heating of the color ribbon, for example cholesterol or vanillin.

Suitable inert substrates are described for example in EP-A-441,282 or in the relevant patent applications cited therein. The thickness of the substrate is in general from 3 to 30 µm, preferably from 5 to 10 µm.

As dye receptor layer it is basically possible to use any heat stable plastics layer which possesses affinity for the dyes to be transferred, eg. modified polycarbonates or polyesters. Further details may be found for example in EP-A-441,282 or in the relevant patent applications cited therein.

The transfer is effected by means of an energy source, for example by means of a laser or by means of a thermal head that must be heatable to <300° C. in order for dye transfer to take place within the time range t: $0 < t < 15$ msec. In the course of transfer, the dye migrates out of the transfer sheet and diffuses into the surface coating of the receiving medium.

Mixtures of the novel dyes I with one another are also particularly suitable.

The dyes according to the present invention are also advantageously suitable for dyeing synthetic materials, for example polyesters, polyamides or polycarbonates. Of particular suitability are textile fabrics made of polyester or polyamide or polyester-cotton blend fabrics.

The novel dyes are also advantageous for preparing color filters as described for example in EP-A-399,473.

Finally, they can also be advantageously used as colorants for preparing toners for electrophotography.

Embodiments of the invention will now be more particularly described by way of example. Preparation of dyes

EXAMPLE 1

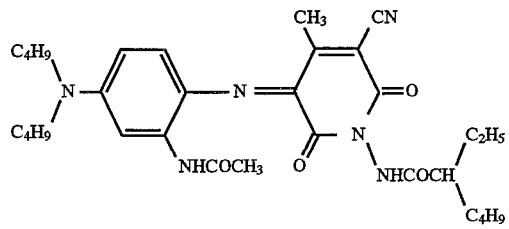

13.1 g of 3-acetylamino-N,N-dibutylaniline were nitrosated with sodium nitrite in an aqueous medium acidified with hydrochloric acid. After addition of 20% by weight ammonia solution in water to pH 8, the compound of the formula

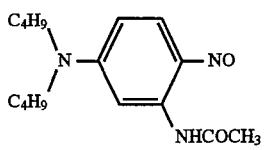

was taken up in methylene chloride. The organic phase was separated off in a separating funnel and combined with a solution of 15.5 g of the pyridone

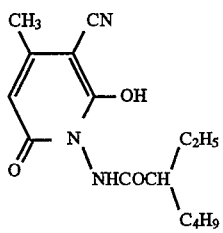

in 30 ml of acetic anhydride.

After the methylene chloride had been distilled off, the residue was briefly heated to 90° C. and then cooled down to room temperature. Then 100 ml of isopropanol and 50 ml of methanol were added, and the dye was precipitated with about 5 ml of water. Filtering off with suction and thorough washing with methanol left 18.1 g (64% of theory) of the above dye in a spectrally pure form.

Melting point: 170°–174° C. $\lambda_{max}$ (tetrahydrofuran): 590 nm (methylene chloride): 598 nm.

EXAMPLE 2

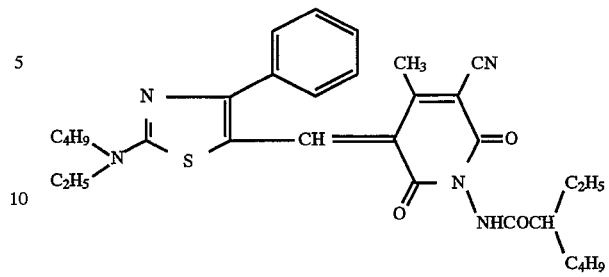

15.5 g of the pyridone described in Example 1 were stirred with 15.1 g of 2-(N-butyl-N-ethylamino)-4-phenyl-5-formylthiazole, 0.5 g of β-alanine and also 2.0 g of p-toluenesulfonic acid in 65 ml of ethyl acetate at room temperature for 3.5 hours. Then the mixture was heated at 50° C. for 30 minutes. After cooling down to room temperature, the dye was filtered off with suction, washed neutral with a little methanol and water and dried under reduced pressure at 95° C. The yield of spectrally pure product was 17.6 g (63% of theory), Melting point: 141° C. $\lambda_{max}$ (tetrahydrofuran): 532 nm (methylene chloride): 537 nm.

The same method was used to obtain the dyes listed below in Tables 1 to 3, In these tables, the entries in the column headed $R^3$ are designations of the formulae given in the description.

TABLE 1

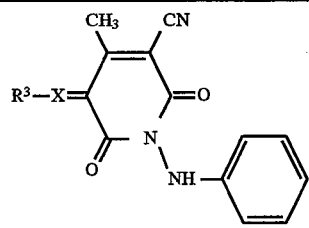

| Ex. No. | $R^3$ | X | $R^4$ | $R^5$ | $R^6$ | $R^7$ | $R^9$ | $\lambda_{max}$ [nm] in $CH_2Cl_2$ |
|---|---|---|---|---|---|---|---|---|
| 3 | III | CH | — | — | $C_2H_5$ | $C_4H_9$ | $C_6H_5$ | 537 |
| 4 | III | CH | — | — | $C_2H_5$ | $C_6H_{13}$ | $CH(CH_3)_2$ | 524 |
| 5 | IIa | N | $NHCOCH_3$ | H | $C_4H_9$ | $C_4H_9$ | — | 599 |
| 6 | IIp | CH | — | — | $CH_3$ | — | — | 521 |
| 7 | III | CH | — | — | $CH_3$ | $C_6H_{11}$ | $C_6H_5$ | 537 |
| 8 | III | CH | — | — | $C_2H_5$ | $C_2H_5$ | $CH(CH_3)_2$ | 524 |
| 9 | IIp | CH | — | — | $CH_3$ | — | — | 521 |

TABLE 2

| Ex. No. | R³ | X | R⁴ | R⁵ | R⁶ | R⁷ | R⁹ | $\lambda_{max}$ [nm] in $CH_2Cl_2$ |
|---|---|---|---|---|---|---|---|---|
| 10 | III | CH | — | — | $CH(CH_3)_2$ | $CH(CH_3)_2$ | $C_6H_5$ | 538 |
| 11 | IIp | CH | — | — | $CH_3$ | — | — | 522 |
| 12 | IIc | CH | H | $CH_3$ | $CH_3$ | — | — | 534 |
| 13 | IIa | CH | H | H | $C_2H_4-C_6H_5$ | $C_2H_4CN$ | — | 537 |
| 14 | III | CH | — | — | $C_6H_{11}$ | $C_6H_{11}$ | $C_6H_5$ | 542 |
| 15 | IIp | CH | — | — | $CH_3$ | — | — | 522 |
| 16 | IIo | CH | — | — | — | — | H | 514 |
| 17 | III | N | — | — | $C_2H_5$ | $C_2H_5$ | $C_6H_5$ | 586 |
| 18 | IIc | N | H | H | $C_2H_5$ | — | — | 599 |

TABLE 3

| Ex. No. | R¹ | R³ | X | R⁴ | R⁵ | R⁶ | R⁷ | R⁸ | R⁹ | $\lambda_{max}$ [nm] in $CH_2Cl_2$ |
|---|---|---|---|---|---|---|---|---|---|---|
| 19 | $CH_3$ | III | N | — | — | $CH(CH_3)_2$ | $CH(CH_3)_2$ | — | $C_6H_5$ | 587 |
| 20 | $CH_3$ | III | CH | — | — | $C_6H_{11}$ | $CH_3$ | — | $C_6H_5$ | 535 |
| 21 | $CH_3$ | III | CH | — | — | $CH(CH_3)_2$ | $CH(CH_3)_2$ | — | $C_6H_5$ | 538 |
| 22 | $CH_3$ | IIc | CH | H | $CH_3$ | $CH_3$ | — | — | — | 536 |
| 23 | $CH_3$ | III | CH | — | — | $C_4H_9$ | $C_4H_9$ | — | $C_6H_5$ | 537 |
| 24 | $CH_3$ | III | CH | — | — | $C_2H_5$ | $C_2H_5$ | — | $C_6H_5$ | 534 |
| 25 | $CH_3$ | III | CH | — | — | $C_6H_{11}$ | $C_2H_5$ | — | $C_6H_5$ | 540 |
| 26 | $CH_3$ | III | CH | — | — | $C_6H_{11}$ | $C_6H_{11}$ | — | $C_6H_5$ | 541 |
| 27 | $CH_3$ | IIa | N | $NHCOCH_3$ | H | $C_2H_5$ | $C_2H_5$ | — | — | 595 |
| 28 | $CH_3$ | III | CH | — | — | $C_2H_5$ | $C_4H_9$ | — | $C_6H_5$ | 537 |
| 29 | $CH_3$ | III | CH | — | — | $C_2H_5$ | $C_2H_5$ | — | $CH(CH_3)_2$ | 524 |
| 30 | $CH_3$ | IIc | CH | H | H | $C_2H_4CO_2C_2H_5$ | — | — | — | 541 |
| 31 | $CH_3$ | IIa | N | $CH_3$ | H | $C_4H_9$ | $C_4H_9$ | — | — | 678 |
| 32 | $CH_3$ | IIj | CH | — | — | $C_4H_4-O-C_2H_4$*) | — | Cl | — | 557 |
| 33 | $CH_3$ | IIj | CH | — | — | $C_4H_8$**) | — | $P-CH_3-C_6H_4$ | — | 544 |
| 34 | $CH_3$ | III | CH | — | — | $C_3H_7$ | $C_3H_7$ | — | $P-CH_3O-C_6H_4$ | 534 |
| 35 | H | III | CH | — | — | $C_4H_9$ | $C_4H_9$ | — | $C_6H_5$ | 545 |

*) n = 1
**) n = 0

TABLE 4

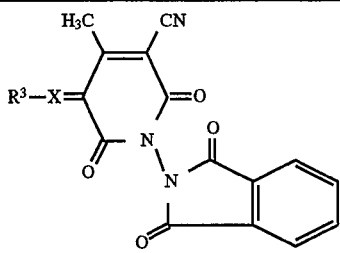

| Ex. No. | R³ | X | R⁴ | R⁵ | R⁶ | R⁷ | R⁹ | $\lambda_{max}$ [nm] in $CH_2Cl_2$ |
|---|---|---|---|---|---|---|---|---|
| 36 | III | CH | — | — | C₄H₉ | C₄H₉ | C₆H₅ | 537 |
| 37 | IIa | N | CH₃ | H | C₂H₅ | C₄H₉ | — | 713 |
| 38 | IIa | N | NHCOCH₃ | H | C₂H₅ | C₂H₅ | — | 593 |

Embodiments of the invention will now be more particularly described by way of example. Preparation of dyes

EXAMPLE 39

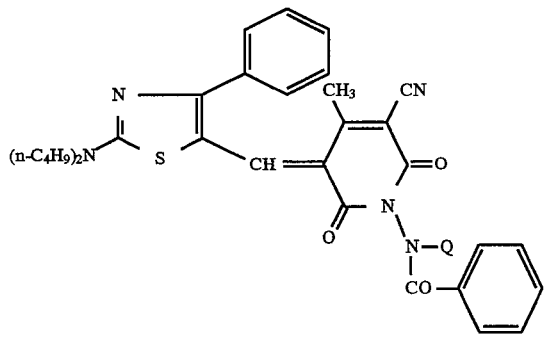

349.7 g of 1-benzoylamino-2-hydroxy-4-methyl-5-cyanopyrid-6-one were suspended in 1.5 l of toluene and 13 g of p-toluenesulfonic acid. 529.3 g of 78% strength by weight of 2-(di-n-butylamino)-4-phenyl-5-formylthiazole were added dropwise at 70° C. The reaction mixture was refluxed for 6 hours under a water separator. After 1 l of toluene had been distilled off, the reaction mixture was cooled down to room temperature. The precipitate was filtered off with suction and dried at 50° C. under reduced pressure. This left 692.3 g (94% of theory) of the abovementioned compound (Q=H) having a melting point of 236° C.

(Using isobutanol as solvent the compound was obtained in a 76% yield.)

567 g of the compound described under a) were suspended in 800 ml of acetic anhydride and heated at the boil for 2 hours. The resulting solution was cooled down to 60° C., which brought down a precipitate, and then diluted with 450 ml of methanol. The precipitate was filtered off with suction and washed with methanol and water. Drying under reduced pressure at 50° C. left 458.3 g (75% of theory) of the abovementioned compound (Q=COCH₃) having a melting point of 193° C.

$\lambda_{max}$=measured in $CH_2Cl_2$: 537 nm)

TABLE 5

The same method was used to obtain the dyes listed below in Table 5.

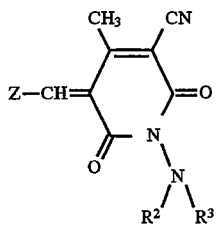

| Ex. No. | Z | R² | R³ | $\lambda_{max}$ (in $CH_2Cl_2$) or mp. |
|---|---|---|---|---|
| 40 | ![N=C(N(n-C₄H₉)₂)S-C(C₆H₅)=] | COC₆H₅ | COC₂H₅ | 224° C. |
| 41 | ![N=C(N(n-C₄H₉)₂)S-C(C₆H₅)=] | COC₆H₅ | COC₆H₅ | 130–134° C. |

TABLE 5-continued

The same method was used to obtain the dyes listed below in Table 5.

Z—CH=[ring with CH₃ and CN substituents, two C=O groups, N-N(R²)(R³)]

| Ex. No. | Z | R² | R³ | λmax (in CH₂Cl₂) or mp. |
|---|---|---|---|---|
| 42 | [(CH₃)₂CH]₂N–C(=S)–N(C₆H₅)–C(CH₃)=CH– | COCH₃ | COCH(C₂H₅)(C₄H₉) | 539 nm |
| 43 | (C₂H₅)₂N–C(=S)–N(C₆H₅)–C(CH₃)=CH– | COC₆H₅ | COCH₃ | 537 nm |
| 44 | (C₂H₅)₂N–C(=S)–N(CH(CH₃)₂)–C(CH₃)=CH– | COC₆H₅ | COCH₃ | 524 nm |
| 45 | (C₄H₉)(C₂H₅)N–C(=S)–N(C₆H₅)–C(CH₃)=CH– | COCH₃ | COCH(C₂H₅)(C₄H₉) | 537 nm |
| 46 | (C₂H₅)₂N–C(=S)–N(C₆H₄-p-F)–C(CH₃)=CH– | COC₆H₅ | COCH₃ | 536 nm |
| 47 | morpholino–N=CH–N=C(S–)(with NC and Cl and CH₃ substituents on thiophene) | COC₆H₅ | COCH₃ | 565 nm* |
| 48 | 1,1,2-trimethyl-indoline-3-ylidene-CH– | COCH₃ | COCH(C₂H₅)(C₄H₉) | 521 nm |
| 49 | 1-(C₂H₄COOC₂H₅)-2,2,4,6-tetramethyl-1,2,3,4-tetrahydroquinolin-yl | COC₆H₅ | COCH₃ | 549 nm |

*measured in tetrahydrofuran

EXAMPLE 50

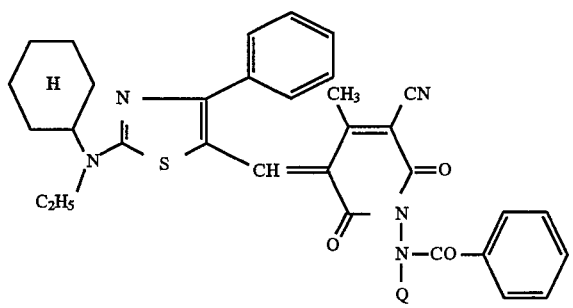

65 g of 2-(N-ethyl-N-cyclohexylamino)-4-phenyl-5-formylthiazole and 53.8 g of 1-benzoylamino-2-hydroxy-4-methyl-5-cyanopyrid-6-one were added to 200 ml of acetic anhydride, heated with stirring to reflux temperature (136° C.) in the course of 15 minutes and held at that reflux temperature for 15 minutes. The mixture was then cooled down to 28° C. and the precipitate was filtered off with suction. It was washed portionwise with 350 ml of methanol and then with 1000 ml of water. It was then dried at 75° C. under reduced pressure.

This left 103 g of a spectrally pure magenta mixture having a melting point of 258° C. and, according to HPLC, the following composition:

Q=COCH₃ 66%

Q=H 33%

$\lambda_{max}$ (in methylene chloride): 538 nm.

EXAMPLE 51

Example 51 was carried out by a method similar to that of Example 50 except that the refluxing was carried out for 4 hours. This resulted in complete acetylation (Q=COCH₃). $\lambda_{max}$ (in methylene chloride): 540 nm.

TABLE 6

The same method was used to obtain the dyes listed below in Table 6.

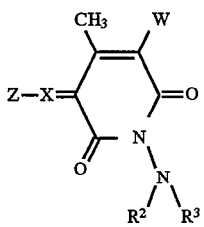

| Ex. No. | Z | X | R² | R³ | W | $\lambda_{max}$ (in CH₂Cl₂) or mp. |
|---|---|---|---|---|---|---|
| 52 | (H₉C₄)(H₅C₂)N—C(=N—)—S—C(=)—C(phenyl)= | CH | COCH₃ | COC₆H₅ | CN | 536 |
| 53 | (H₅C₂)₂N—C(=N—)—S—C(=)—C(3-F-phenyl)= | CH | COCH₃ | COCH₃ | CN | 536 |
| 54 | (H₉C₄)₂N—C(=N—)—S—C(=)—C(phenyl)= | N | COCH₃ | COC₆H₅ | CN | 586 |
| 55 | (H₉C₄)(H₅C₂)N—C(=N—)—S—C(=)—C(phenyl)= | CH | COC₂H₅ | COC₆H₅ | CN | 537 |

TABLE 6-continued

The same method was used to obtain the dyes listed below in Table 6.

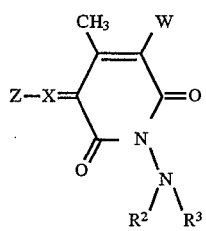

| Ex. No. | Z | X | R² | R³ | W | λmax (in CH₂Cl₂) or mp. |
|---|---|---|---|---|---|---|
| 56 | H₉C₄(H₅C₂)N–C(S)=N–C(Ph)=C(CH₃)– | CH | COC₃H₇ | COC₆H₅ | CN | 537 |
| 57 | H₉C₄(H₅C₂)N–C(S)=N–C(Ph)=C(CH₃)– | CH | COCH(CH₃)₂ | COC₆H₅ | CN | 537 |
| 58 | (H₅C₂)₂N–C(S)=N–C(Ph)=C(CH₃)– | CH | COCH(CH₃)₂ | COC₆H₅ | CN | 534 |
| 59 | (H₇C₃)₂N–C(S)=N–C(4-MeO-C₆H₄)=C(CH₃)– | CH | COCH₃ | COC₆H₅ | CN | 539 |
| 60 | (H₅C₂)₂N–C(S)=N–C(2-thienyl)=C(CH₃)– | CH | COCH₃ | COC₆H₅ | CN | 555 |
| 61 | (H₉C₄)₂N–C(S)=N–C(2-thienyl)=C(CH₃)– | CH | COCH₃ | COC₆H₅ | CN | 556 |
| 62 | (H₅C₂)₂N–C(S)=N–C(Ph)=C(CH₃)– | CH | COC₆H₅ | COC₆H₅ | CN | 537 |

TABLE 6-continued

The same method was used to obtain the dyes listed below in Table 6.

| Ex. No. | Z | X | R² | R³ | W | λ$_{max}$ (in CH$_2$Cl$_2$) or mp. |
|---|---|---|---|---|---|---|
| 63 | (H$_9$C$_4$)$_2$N— aryl with CH$_3$ | N | COCH$_3$ | COC$_6$H$_5$ | CN | 682 |
| 64 | 2-piperidino-3-cyano-5-methyl-4-(p-tolyl)thiophene | CH | COCH$_3$ | COC$_6$H$_5$ | CN | 547 |
| 65 | 2-piperidino-5-methyl-4-phenylthiazole | CH | COCH$_3$ | COC$_6$H$_5$ | CN | 534 |
| 66 | 2-(N,N-diallylamino)-5-methyl-4-phenylthiazole | CH | COCH$_3$ | COC$_6$H$_5$ | CN | 534 |
| 67 | 2-(N,N-dibutylamino)-3-cyano-5-methyl-4-phenylthiophene | CH | COCH$_3$ | COC$_6$H$_5$ | CN | 549 |
| 68 | 2-(N,N-dibutylamino)-5-methyl-4-phenylthiazole | CH | COCH$_3$ | COCH$_3$ | CN | 537 |
| 69 | 2-(N,N-dibutylamino)-5-methyl-4-phenylthiazole | CH | COC$_6$H$_5$ | COCH$_3$ | CO$_2$CH$_3$ | 518 |

TABLE 6-continued

The same method was used to obtain the dyes listed below in Table 6.

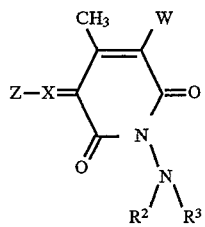

| Ex. No. | Z | X | R² | R³ | W | λ_max (in CH₂Cl₂) or mp. |
|---|---|---|---|---|---|---|
| 70 | (H₉C₄)₂N–C(=N)–S–C(=)–C₆H₅ (with CH₃) | CH | COC₆H₅ | COCH₃ | COCH₃ | 530 |

Transfer of dyes (use)

I. To be able to examine the transfer behavior of the dyes quantitatively and in a simple manner, the thermal transfer was carried out with large hot plates with the transfer temperature being varied within the range 50° C.<T<120° C. while the transfer time was fixed at 2 minutes.

α) General recipe for coating the substrate with dye:

1 g of binder was dissolved in 8 ml of 8:2 v/v toluene/ethanol at 40°–50° C. A solution of 0.25 g of dye in 50 ml of tetrahydrofuran was added with stirring and any insolubles were filtered off. The print paste thus obtained was applied to a polyester film (thickness: 6–10 μm) with an 80 μm doctor and dried with a hairdryer.

β) Test of thermal transferability

The dyes used were tested as follows. The polyester film donor containing the in-test dye in the coated front was placed face down on commercially available (see below for details) paper (receptor) and pressed down. Donor/receptor were then wrapped in aluminum foil and heated between two hot plates at various temperatures T (within the temperature range 50° C.<T<120° C.). The amount of dye which diffuses into the bright plastics layer of the receptor is proportional to the optical density (=absorbance A). The latter was determined photometrically. The plot of the logarithm of the absorbance A of the colored receptor papers measured within the temperature range from 50 to 120° C. against the reciprocal of the corresponding absolute temperature is a straight line from whose slope it is possible to calculate the activation energy $\Delta E_T$ for the transfer experiment:

$$\Delta E_T = 2.3 \times R \times \frac{\Delta \log A}{\Delta \left[\frac{1}{T}\right]}$$

The characterization was completed by additionally taking from the plots the temperature T* [°C] at which the absorbance A of the colored receptor papers attains the value 1.

The dyes listed below in Table 7 were processed according to α) and the resulting dye-coated substrates were tested in respect of their transfer behavior according to β). The table also shows in each case the thermal transfer parameters T* and $\Delta E_T$.

The receiving medium or receptor used was Hitachi color video print paper of grade VY-S. The binder used was Vylon® 290 from Toyobo.

II. General method:

a) 10 g of dye are stirred with or without brief heating to 80°–90° C. into 100 g of a 10% strength by weight solution of a binder (Vylon® 290 from Toyobo) in 4.5:2:2 v/v/v methyl ethyl ketone/toluene/cyclohexanone.

The printing ink is applied with a 6 μm doctor blade to a polyester sheet 6 μm in thickness whose back has been coated with a suitable slipping layer and blown dry with a hairdryer in the course of 1 minute. Before the color ribbon can be printed, it must subsequently air dry for at least 24 hours, since residual solvent can impair the printing process.

b) The color ribbons are printed on a computer controlled experimental setup equipped with a conventional thermal printing head onto Hitachi VY-S video print paper.

The voltage is varied to control the energy output of the thermal printing head, while the pulse duration is set to 7 ms and only one pulse is emitted at a time. The emitted energy ranges from 0.71 to 1.06 mJ/dot.

Since the degree of coloration is directly proportional to the energy supply, it is possible to produce a color wedge for spectroscopic evaluation.

A plot of the depth of shade against the energy supply is used to determine the Q* value (=energy in mJ/dot for absorbance 1) and the slope m in 1/mJ.

The results obtained are listed below in Table 8, which additionally shows the full width at half maximum (FWHM), measured on Hitachi VY-S video print paper, and the weight-specific extinction coefficient (f), measured in methylene chloride.

TABLE 7

| Ex. No. | Dye of Ex. No. | T* [°C.] | $\Delta E_T \left[\frac{kcal}{mol}\right]$ |
|---|---|---|---|
| 71 | 3 | 92 | 15 |
| 72 | 4 | 82 | 12 |
| 73 | 5 | 78 | 10 |
| 74 | 6 | 69 | 10 |
| 75 | 7 | 90 | 10 |
| 76 | 8 | 70 | 11 |

TABLE 7-continued

| Ex. No. | Dye of Ex. No. | T* [°C.] | $\Delta E_T \left[ \frac{kcal}{mol} \right]$ |
|---|---|---|---|
| 77 | 2 | 85 | 16 |
| 78 | 10 | 68 | 14 |
| 79 | 11 | 63 | 13 |
| 80 | 12 | 77 | 9 |
| 81 | 1 | 73 | 12 |
| 82 | 13 | 91 | 10 |
| 83 | 14 | 82 | 13 |
| 84 | 19 | 67 | 11 |
| 85 | 20 | 54 | 11 |
| 86 | 21 | 62 | 12 |
| 87 | 22 | 77 | 10 |
| 88 | 25 | 72 | 11 |
| 89 | 9 | 69 | 10 |
| 90 | 15 | 63 | 13 |

TABLE 8

| Ex. No. | Dye of Ex. No. | Q* [mJ/dot] | m [l/mJ] | FWHM [cm$^{-1}$] | $f \left[ \frac{1}{g \cdot cm} \right]$ |
|---|---|---|---|---|---|
| 91 | 39 | 0.87 | 3.30 | 2527 | 190 |
| 92 | 51 | 0.97 | 2.30 | 2462 | 154 |
| 93 | 42 | 0.95 | 2.86 | 2134 | |
| 94 | 43 | 0.94 | 2.48 | 2536 | 161 |
| 95 | 44 | 0.89 | 3.07 | 2343 | 185 |
| 96 | 45 | 0.90 | 2.52 | 2150 | |
| 97 | 46 | 0.95 | 2.63 | 2821 | |
| 98 | 48 | 1.29 | 1.22 | 2358 | |
| 99 | 49 | 1.07 | 2.01 | 3394 | |
| 100 | 50 | 1.03 | 2.21 | 2517 | 164 |
| 101 | 16 | 1.09 | 1.90 | 2490 | |
| 102 | 17 | 1.38 | 1.26 | 2740 | 116 |
| 103 | 18 | 1.34 | 1.49 | 4352 | |
| 104 | 23 | 1.04 | 2.02 | 2608 | 129 |
| 105 | 24 | 1.19 | 1.59 | 2596 | 155 |
| 106 | 26 | 1.70 | 1.35 | 2310 | |
| 107 | 27 | 1.65 | 1.40 | 3765 | |
| 108 | 28 | 1.13 | 1.85 | 2238 | 155 |
| 109 | 29 | 1.18 | 1.48 | 2268 | 246 |
| 110 | 30 | 1.23 | 1.51 | 3842 | 139 |
| 111 | 31 | 1.26 | 1.65 | 4263 | |
| 112 | 32 | 1.75 | 1.23 | | |
| 113 | 33 | 1.49 | 1.16 | 1918 | |
| 114 | 34 | 1.30 | 1.43 | 2678 | |
| 115 | 36 | 1.00 | 2.34 | 2150 | |
| 116 | 37 | 1.01 | 2.22 | 4283 | |
| 117 | 38 | 1.94 | 0.74 | 3300 | |
| 118 | 52 | 0.96 | 2.34 | 2587 | 163 |
| 119 | 53 | 0.93 | 2.86 | 2301 | |
| 120 | 54 | 1.07 | 1.94 | 2210 | 125 |
| 121 | 55 | 1.01 | 2.24 | 2213 | |
| 122 | 56 | 1.04 | 2.19 | 2252 | |
| 123 | 57 | 1.06 | 2.14 | 2552 | |
| 124 | 58 | 1.28 | 1.41 | 2270 | |
| 125 | 59 | 1.06 | 2.02 | 2267 | |
| 126 | 60 | 1.06 | 2.09 | 2630 | |
| 127 | 61 | 1.07 | 1.99 | 2507 | |
| 128 | 62 | 2.48 | 0.53 | 2103 | |
| 129 | 63 | 1.33 | 1.34 | 4630 | |
| 130 | 64 | 1.12 | 2.15 | 1711 | |
| 131 | 65 | 1.12 | 1.91 | 2310 | |
| 132 | 66 | 1.01 | 2.37 | 2261 | |
| 133 | 67 | 1.94 | 0.73 | 1980 | |
| 134 | 66 | 0.91 | 3.08 | 2103 | |
| 135 | 69 | 1.02 | 2.13 | 2981 | |
| 136 | 70 | 1.07 | 1.86 | 2846 | |

We claim:

1. A process for transferring a pyridone dye from a transfer to plastic-coated paper by diffusion or sublimation with the aid of an energy source, which comprises transferring said dye from a said transfer to said plastic-coated paper, wherein said transfer has thereon one or more of the pyridone dyes of the formula (I):

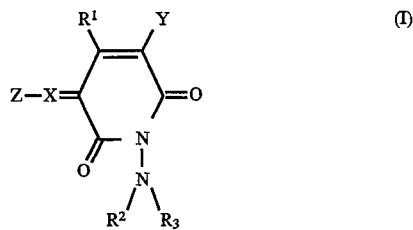

wherein:

R$^1$ is hydrogen or C$_1$–C$_4$-alkyl;

R$^2$ and R$^3$ are identical or different and each is independently of the other, hydrogen, C$_1$–C$_{12}$-alkyl, C$_1$–C$_{12}$-alkyl substituted by cyano, phenyl, tolyl, C$_1$–C$_6$-alkanoyloxy, C$_1$–C$_4$-alkoxycarbonyl, C$_1$–C$_4$-alkoxycarbonyl substituted in an alkoxy group thereof by phenyl or C$_1$–C$_4$-alkoxy; C$_4$–C$_7$-cycloalkyl, phenyl, phenyl substituted by C$_1$–C$_4$-alkyl or C$_1$–C$_6$-alkoxyl; pyridyl, pyridyl substituted by C$_1$–C$_4$-alkyl or C$_1$–C$_6$-alkoxyl; C$_1$–C$_{12}$-alkanoyl, C$_1$–C$_{12}$-alkanoyl substituted by cyano, phenyl, tolyl, C$_1$–C$_6$-alkanoyloxy, C$_1$–C$_4$-alkoxycarbonyl, C$_1$–C$_4$-alkoxycarbonyl, C$_1$–C$_4$-alkoxycarbonyl substituted in an alkoxy group thereof by phenyl or C$_1$–C$_4$-alkoxy; C$_1$–C$_{12}$-alkoxycarbonyl, C$_1$–C$_{12}$-alkylsulfonyl, C$_1$–C$_{12}$-alkylsulfonyl, substituted by cyano, phenyl, tolyl, C$_1$–C$_6$-alkanoyloxy; C$_1$–C$_6$-alkoxycarbonyl, C$_1$–C$_4$-alkoxycarbonyl, C$_1$–C$_4$-alkoxycarbonyl substituted in an alkoxy group thereof by phenyl or C$_1$–C$_4$-alkoxy; C$_5$–C$_7$-cycloalkylsulfonyl, phenylsulfonyl, phenylsulfonyl substituted by C$_1$–C$_4$-alkyl; pyridylsulfonyl, pyridylsulfonyl substituted by C$_1$–C$_4$-alkyl or C$_1$–C$_6$-alkoxyl; benzoyl, benzoyl, substituted by C$_1$–C$_4$-alkyl or C$_1$–C$_6$-alkoxyl; pyridylcarbonyl or thienylcarbonyl or are together with the nitrogen atom to which they are bonded unsubstituted or C$_1$–C$_4$-alkyl-substituted succinimido, unsubstituted or C$_1$–C$_4$-alkyl-substituted phthalimido or a heterocyclic ring selected from the group consisting or pyrrolidinyl, piperidinyl, morpholinyl, piperazinyl and N—C$_1$–C$_4$-alkyl-piperazinyl;

X is —CH— or —N—;

Y is cyano or a radical of the formula CO—W, CO—OW or CO—NHW where W is hydrogen, C$_1$–C$_8$-alkyl which is unsubstituted or substituted by cyano, phenyl, tolyl, C$_1$–C$_6$-alkanoyloxy, C$_1$–C$_4$-alkoxycarbonyl, C$_1$–C$_4$-alkoxycarbonyl substituted in an alkoxy group thereof by phenyl or C$_1$–C$_4$-alkoxy; and which is uninterrupted or interrupted by one or two oxygen atoms in an ether function, C$_5$–C$_7$-cycloalkyl, phenyl or tolyl, and Z is a radical of the formula:

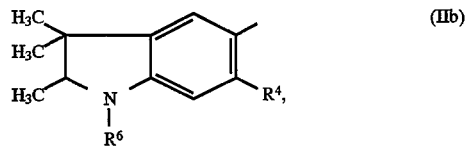

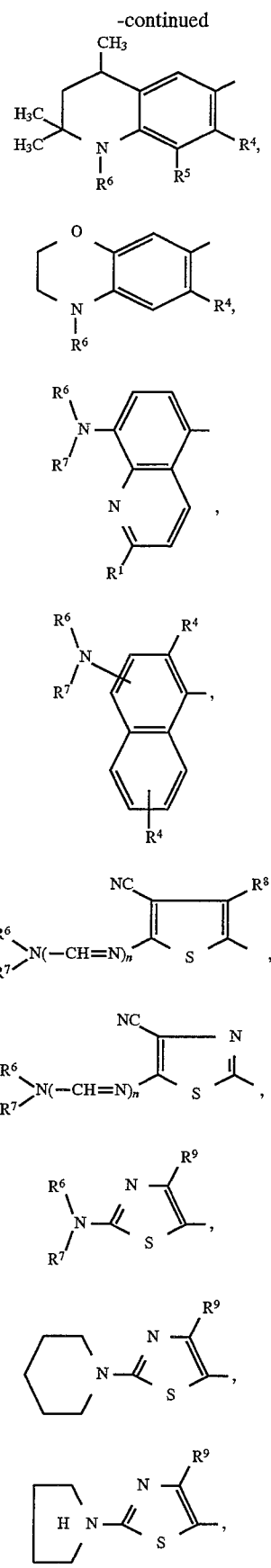
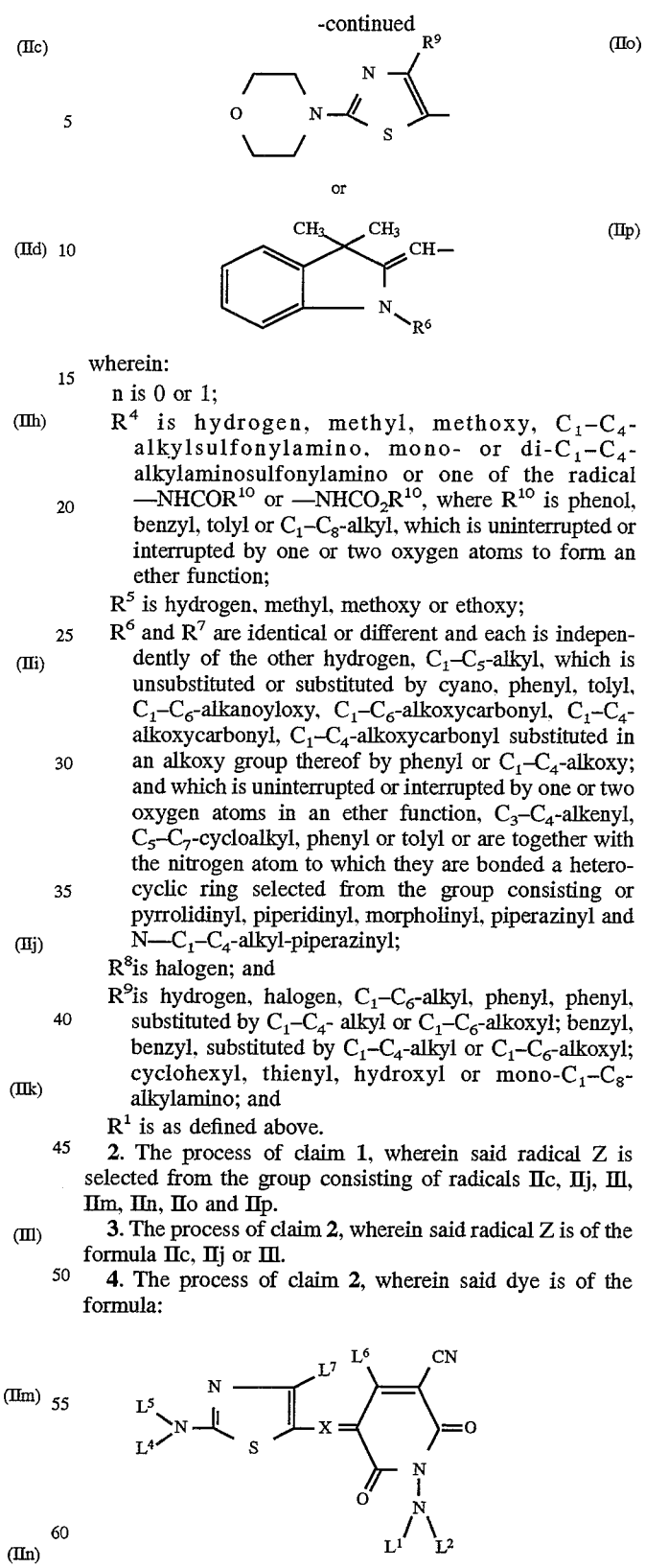

wherein:

n is 0 or 1;

$R^4$ is hydrogen, methyl, methoxy, $C_1$-$C_4$-alkylsulfonylamino, mono- or di-$C_1$-$C_4$-alkylaminosulfonylamino or one of the radical —$NHCOR^{10}$ or —$NHCO_2R^{10}$, where $R^{10}$ is phenol, benzyl, tolyl or $C_1$-$C_8$-alkyl, which is uninterrupted or interrupted by one or two oxygen atoms to form an ether function;

$R^5$ is hydrogen, methyl, methoxy or ethoxy;

$R^6$ and $R^7$ are identical or different and each is independently of the other hydrogen, $C_1$-$C_5$-alkyl, which is unsubstituted or substituted by cyano, phenyl, tolyl, $C_1$-$C_6$-alkanoyloxy, $C_1$-$C_6$-alkoxycarbonyl, $C_1$-$C_4$-alkoxycarbonyl, $C_1$-$C_4$-alkoxycarbonyl substituted in an alkoxy group thereof by phenyl or $C_1$-$C_4$-alkoxy; and which is uninterrupted or interrupted by one or two oxygen atoms in an ether function, $C_3$-$C_4$-alkenyl, $C_5$-$C_7$-cycloalkyl, phenyl or tolyl or are together with the nitrogen atom to which they are bonded a heterocyclic ring selected from the group consisting or pyrrolidinyl, piperidinyl, morpholinyl, piperazinyl and N—$C_1$-$C_4$-alkyl-piperazinyl;

$R^8$ is halogen; and $R^9$ is hydrogen, halogen, $C_1$-$C_6$-alkyl, phenyl, phenyl, substituted by $C_1$-$C_4$- alkyl or $C_1$-$C_6$-alkoxyl; benzyl, benzyl, substituted by $C_1$-$C_4$-alkyl or $C_1$-$C_6$-alkoxyl; cyclohexyl, thienyl, hydroxyl or mono-$C_1$-$C_8$-alkylamino; and $R^1$ is as defined above.

2. The process of claim 1, wherein said radical Z is selected from the group consisting of radicals IIc, IIj, III, IIm, IIn, IIo and IIp.

3. The process of claim 2, wherein said radical Z is of the formula IIc, IIj or III.

4. The process of claim 2, wherein said dye is of the formula:

wherein:

X is —CH— or —N—;

$L^1$ and $L^2$ are each independently of each other hydrogen, $C_1$-$C_8$-alkyl, phenyl, tolyl, $C_1$-$C_8$-alkylcarbonyl, $C_1$-$C_8$-alkylsulfonyl, phenylsulfonyl, tolylsulfonyl, pyridylsulfonyl, benzoyl, methalbenzoyl, pyridylcarbonyl or thienylcarbonyl;

$L^4$ and $L^5$ are each independently of the other hydrogen, $C_1$-$C_8$-alkyl, 2-cyanoethyl, benzyl, $C_1$-$C_4$-alkanoyloxy-$C_1$-$C_4$-alkyl, $C_1$-$C_4$-alkoxycarbaryl-$C_1$-$C_4$-alkyl or $C_1$-$C_4$-alkoxycarbonyloxy-$C_1$-$C_4$-alkyl;

$L^6$ is hydrogen or methyl; and $L^7$ is $C_1$-$C_6$-alkyl, phenyl, tolyl, benzyl, cyclohexyl or thienyl.

5. The process of claim 4, wherein X is —CH— or —N—.

6. The process of claim 1, wherein said dye is of the formula:

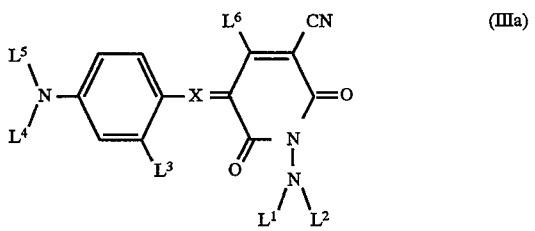 (IIIa)

wherein:

X is —CH— or —N—;

$L^1$ and $L^2$ are each independently of the other hydrogen, $C_1$-$C_8$ alkyl, phenyl, tolyl, $C_1$-$C_8$-alkylcarbonyl, $C_1$-$C_8$-alkylsulfonyl, phenylsulfonyl, tolylsulfonyl, pyridylsulfonyl, benzoyl, methylbenzoyl, pyridylcarbonyl or thienylcarbonyl;

$L^3$ is hydrogen, methyl, methoxy or the radical —NHCOR$^{10}$ or —NHCO$_2$R$^{10}$, where R is phenyl, benzyl, tolyl or $C_1$-$C_8$-alkyl, which is uninterrupted or interrupted by one or two oxygen atoms in an ether function;

$L^4$ and $L^5$ are each independently of the other hydrogen, $C_1$-$C_8$-alkyl, 2-cyanoethyl, benzyl, $C_1$-$C_4$-alkanoyloxy-$C_1$-$C_4$-alkyl, $C_1$-$C_4$-alkanoylcarbonyl-$C_1$-$C_4$-alkyl or $C_1$-$C_4$-alkoxycarbonyloxy-$C_1$-$C_4$-alkyl; and $L^6$ is hydrogen or methyl.

7. The process of claim 4, wherein X is —CH—.

8. The process of claim 6, wherein $L^1$ and $L^2$ are each independently of the other $C_1$-$C_8$-alkoxycarbonyl, benzoyl, methylbenzoyl or thienylcarbonyl.

9. The process of claim 1, wherein said energy source can effect dye transfer in less than 15 msec. from a transfer sheet to a receiving medium.

* * * * *

UNITED STATES PATENT AND TRADEMARK OFFICE
CERTIFICATE OF CORRECTION

PATENT NO.  : 5,654,122
DATED       : August 5, 1997
INVENTOR(S) : Karl-Heinz ETZBACH et al.

It is certified that error appears in the above-indentified patent and that said Letters Patent is hereby corrected as shown below:

On the title page, Item [30], the first Foreign Application Date should read:

-- Oct. 22, 1991 --

Signed and Sealed this

Ninth Day of December, 1997

Attest:

BRUCE LEHMAN

Attesting Officer

Commissioner of Patents and Trademarks